US006094911A

United States Patent [19]

[11] Patent Number: 6,094,911

Crawshaw

[45] Date of Patent: Aug. 1, 2000

[54] LOAD SENSING HYDRAULIC SYSTEM WITH HIGH PRESSURE CUT-OFF BYPASS

[75] Inventor: Claude T. Crawshaw, Channanhon, Ill.

[73] Assignee: Caterpillar Inc., Peoria, Ill.

[21] Appl. No.: 09/216,441

[22] Filed: Dec. 18, 1998

[51] Int. Cl.[7] ...... F16D 31/00

[52] U.S. Cl. ...... 60/452

[58] Field of Search ...... 60/452

[56] References Cited

U.S. PATENT DOCUMENTS

| | | | |
|---|---|---|---|
| 3,797,245 | 3/1974 | Hein | 60/452 |
| 4,199,942 | 4/1980 | Kasper | 60/452 |
| 5,077,972 | 1/1992 | Bianchetta et al. | 60/427 |
| 5,129,229 | 7/1992 | Nakamura et al. | 60/452 |
| 5,197,864 | 3/1993 | Lunzman et al. | 417/218 |

*Primary Examiner*—F. Daniel Lopez

*Attorney, Agent, or Firm*—Haverstock Garrett & Roberts

[57] ABSTRACT

A hydraulic system having a load sensing capability with a high pressure cut-off either operational or bypass is disclosed. The hydraulic system includes a pump having variable displacement under control of a pump control signal, a signal duplicator, at least one pressure relief device operable in cooperation with the signal duplicator, and at least one working element driven by the pump. The system includes a high pressure cut-off selector operable in a first mode to allow the signal duplicator to provide the control signal, and in another mode to allow a true signal to control the pump. The system includes a differential relief valve operable to prevent relief flow therethrough when the signal duplicator pressure exceeds the pump output pressure, and to allow relief flow therethrough when pump pressure exceeds the signal duplicator pressure, such that a load sensing capability is maintained under high pump pressure conditions using either the duplicator signal or the true signal for pump control.

3 Claims, 1 Drawing Sheet

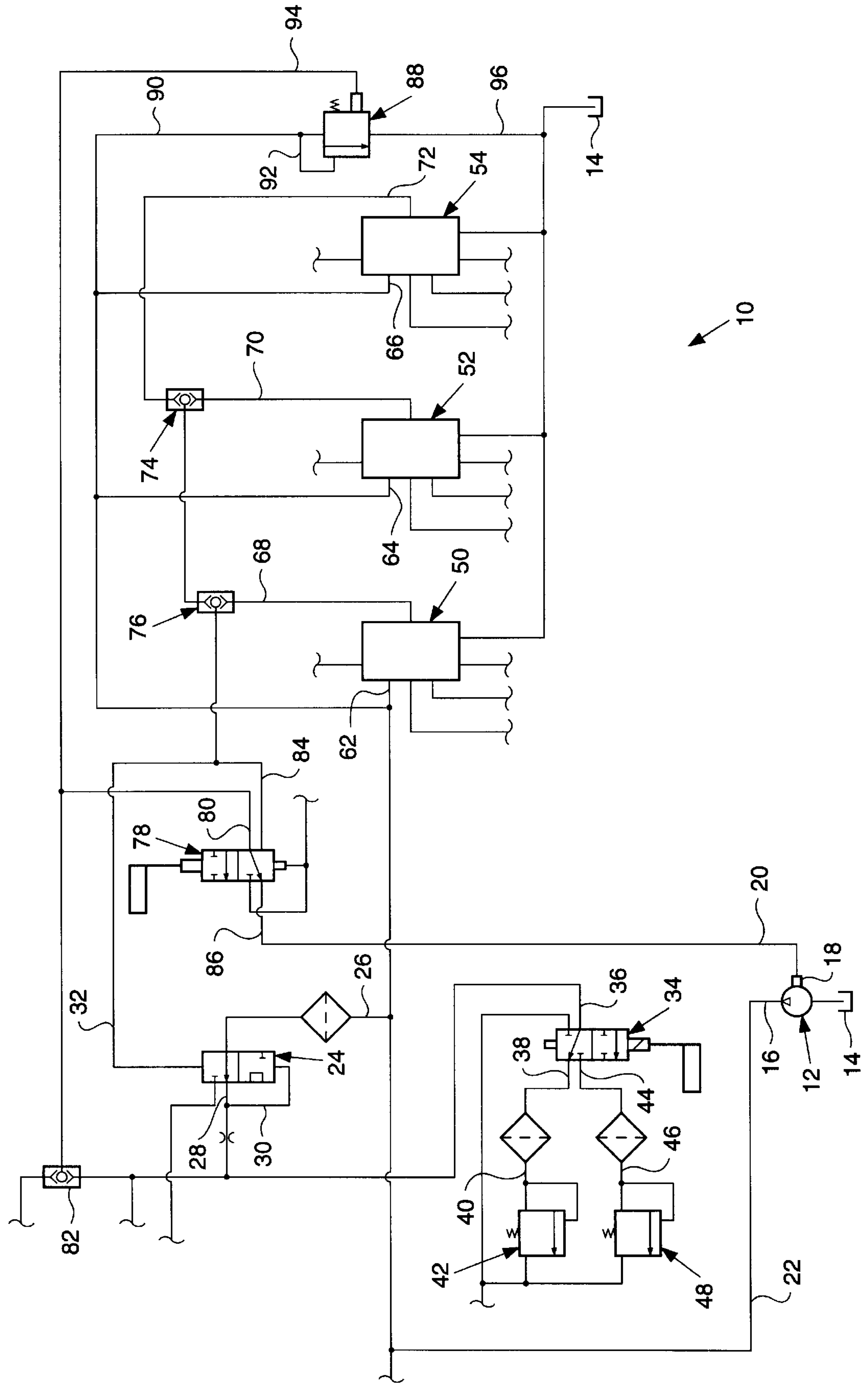
94
90
88
96
92
72
54
14
10
70
52
66
74
68
64
50
76
62
84
80
78
20
86
18
26
36
34
32
38
24
16
12
14
44
46
28
30
40
82
42
48
22

LOAD SENSING HYDRAULIC SYSTEM WITH HIGH PRESSURE CUT-OFF BYPASS

TECHNICAL FIELD

This invention relates generally to a hydraulic circuit for controlling a variable displacement hydraulic pump with load sensing and high pressure cut-off capabilities, and more particularly, to a hydraulic system which provides the load sensing capability with the high pressure cut-off capability operational, or bypassed.

BACKGROUND ART

Hydraulic systems for machines such as excavators, earthmovers, and the like, typically include a pump control having a high pressure cut-off valve. The high pressure cut-off valve functions to reduce the displacement of the pump so that pump flow is at substantially zero whenever the pump output pressure approaches the opening pressure of a main relief valve of the system, to prevent large power losses occurring when high pressure fluid is vented to a tank through the relief valve. Many operators like this feature because it reduces power losses, and, thus saves fuel.

However, some operators believe that the machine is not really working hard unless the engine lugs down due to fluid flow across the relief valve during heavy loading. Also, after the displacement of the pump has been reduced, some time lag will exist before high pump flow is reinstated. Thus, some machine hydraulic systems are not provided with high pressure cut-off valves, and some operators of machines with high pressure cut-off systems prefer to switch the systems off when operating under heavy loads, to avoid the above described problems.

With either a high pressure cut-off capability enabled or bypassed, it is still desirable to provide a load sensing capability, that is, the capability to operate the system under high pressure conditions without automatic substantial reductions in pump displacement. It is also desirable to have the capability to operate the system under high loading conditions without substantial reductions in pump displacement and the resultant time lags before pump pressure rises again.

Accordingly, the present invention is directed to overcoming one or more of the problems as set forth above.

DISCLOSURE OF THE INVENTION

In one aspect of the present invention, a hydraulic system having a load sensing capability with a high pressure cut-off either operational or bypassed is disclosed. The hydraulic system includes a variable displacement pump having an outlet port and a control signal port for receiving a pump control signal operable for varying a displacement characteristic of the pump. The system includes a signal duplicator having an intake port connected in communication with the outlet port of the pump for receiving fluid therefrom, an outlet port, a first pilot port connected in communication with the outlet port thereof, and a second pilot port, the signal duplicator being operable to allow flow therethrough between the inlet port thereof and the outlet port thereof when a pressure condition in the second pilot port thereof exceeds a pressure condition in the first pilot port thereof. The system includes a pressure relief device such as a valve or the like connected in communication with the outlet port of the signal duplicator operable to provide pressure relief when a predetermined pressure condition is present in the outlet port of the signal duplicator. The system provides fluid under pressure from the pump to at least one working element such as a cylinder or the like having an inlet port connected in communication with the outlet port of the pump and a pilot port connected in communication with the second pilot port of the signal duplicator for generating a pressure condition therein representative of a pressure condition in the working element. The system further includes a high pressure cut off selector such as a valve or the like having a first inlet port connected in communication with the signal duplicator outlet, a second inlet port connected in communication with the pilot port of the at least one working element, and an outlet port connected in communication with the control signal port of the pump for delivering the pump control signal thereto.

The high pressure cut-off selector is selectibly operable in a first condition to allow flow therethrough between the first inlet port thereof and the outlet port thereof to allow a fluid signal flow from the signal duplicator output to the control signal port of the pump to serve as the pump control signal. Alternatively, the high pressure cut-off selector is selectibly operable in a second position to allow flow therethrough from the second inlet port in communication with the at least one working element to the outlet port thereof for allowing fluid signal flow from the at least one working element to serve as the pump control signal.

The system further includes a differential relief valve having an inlet port connected in communication with the outlet port of the pump, a first pilot port, and a second pilot port. The first pilot port of the differential relief valve is connected in communication with the inlet thereof, and the second pilot port is connected in communication with the outlet port of the signal duplicator.

In operation, the differential relief valve is operable to prevent relief flow therethrough when the signal duplicator pressure condition exceeds pump output pressure in the inlet port of the differential relief vale, and to allow relief flow when pump pressure exceeds the signal duplicator pressure, such that with the high pressure cut-off in the second position allowing pump control using the fluid signal from the at least one working element, a load sensing capability is maintained under high pump pressure conditions and operational time lags for pressure buildup after high pressure cut-off are avoided.

BRIEF DESCRIPTION OF THE DRAWING

The sole FIGURE is a schematic illustration of an embodiment of the present invention.

BEST MODE FOR CARRYING OUT THE INVENTION

A hydraulic system 10 includes a variable displacement pump 12 connected to a tank 14. Variable displacement hydraulic pump 12 is of conventional construction and operation, driven by a power source such as an internal combustion engine (not shown). Pump 12 includes an outlet port 16 and an internal swash plate (not shown) moveable between maximum and minimum displacement positions by an actuator 18 operable under control of a pump control signal received through an actuator port 20. Outlet port 16 of pump 12 is connected in fluid communication with a main pump output line 22 for communicating hydraulic fluid under pressure to designated portions of system 10 as will be explained.

A signal duplicator 24 has an intake port 26 connected in fluid communication with main pump outlet line 22 and an outlet port 28. Signal duplicator 24 includes a first pilot port 30 connected in communication with outlet port 28 thereof, and a second pilot port 32. Signal duplicator 24 is operable to allow flow therethrough between inlet port 26 and outlet port 28 when a pressure condition in second pilot port 32 exceeds a pressure condition in first pilot port 30.

A high/low signal relief selector 34 has an inlet port 36 connected in communication with outlet port 28 of signal duplicator 24 for receiving a duplicating signal therefrom. Selector 34 includes a first outlet port 38 connected in communication with inlet 40 of a first pressure relief valve 42, and a second outlet port 44 connected in communication with an inlet port 46 of a second pressure relief valve 48. Selector 34 is operable to direct flow between inlet port 36 thereof and first pressure relief valve 42 or second pressure relief valve 48, relief valves 42 and 48 both being normally closed and operable to open and provide relief therethrough, when a predetermined high pressure condition is present in the inlet port thereof. Relief valves 42 and 48 differ in the pressure condition required for opening, relief valve 42 requiring a lower pressure condition, and relief valve 48 requiring a higher pressure condition.

System 10 includes three working elements 50, 52, and 54, each of which includes an operator controlled spool valve or other device and one or more hydraulic cylinders (not shown) operable to perform a work function using fluid under pressure supplied by pump 12 via intake ports 62, 64, and 66 of the respective working elements connected in fluid communication with pump outlet line 22. Working elements 50, 52, and 54 further include respective pilot signal ports 68, 70, and 72 connected through resolvers 74 and 76 with second pilot port 32 of signal duplicator 24 for generating a pressure condition therein reflective of the highest pressure condition in pilot signal ports 68, 70, and 72 of working elements 50, 52, and 54.

System 10 includes a high pressure cut-off selector valve 78 having a first inlet port 80 connected in communication with output port 28 of signal duplicator 24 through a resolver 82 connected in communication with another part of system 10 (not shown). Selector valve 78 includes a second inlet port 84 connected in communication with resolver 76 for receiving a resolved pilot signal from working elements 50, 52, and 54. Selector valve 78 further includes an outlet port 86 connected in communication with actuator port 20 of pump 12 for delivering the pump control signal thereto, selector valve 78 being selectibly operable in a first condition to allow flow therethrough between first inlet port 80 and outlet port 86 thereof such that the duplicating signal from signal duplicator 24 serves as the pump control signal and selectibly operable in a second position to allow flow therethrough from inlet port 84 to the outlet port 86.

A differential relief valve 88 has an inlet port 90 connected to the pump outlet line 22, a first pilot port 92, and a second pilot port 94. First pilot port 92 is connected in communication with inlet port 90 thereof, and second pilot port 94 is connected in communication with outlet port 28 of signal duplicator 24. Differential relief valve 88 is normally closed to prevent flow therethrough between inlet port 90 and an outlet port 96 thereof in communication with tank 14, and is operable to allow relief flow therethrough when pressure conditions in inlet port 90 exceed pressure conditions in second pilot port 94 in communication with outlet port 28 of signal duplicator 24.

In operation, with high pressure cut-off selector valve 78 in the first position to allow pump displacement control with the duplicating signal, the maximum duplicating signal pressure is controlled by high/low signal relief selector 34. When high pressure cut off selector valve 78 is in the second position, pump displacement is controlled by the true signal received from working elements 50, 52, and 54 through resolver 76. In either instance, maximum system pressure in pump outlet line 22 can be maintained under various load conditions with a corresponding load sensing capability.

INDUSTRIAL APPLICABILITY

This invention provides a load sensing capability with high pressure cut-off or without high pressure cut-off, while avoiding perceived lack of power and time lags when load sensing is utilized with high pressure cut-off. The result is maintenance of relatively high pump flow and power to provide pump response and high power when the system is under load.

Other aspects, objects and advantages of the present invention can be obtained from a study of the drawings, the disclosure and the appended claims.

What is claimed is:

1. A load sensing hydraulic system with selectible high pressure cut-off bypass, comprising:

a variable displacement pump having an outlet port and an actuator port for receiving a pump control signal operable for varying a displacement characteristic of the pump;

a signal duplicator having an intake port connected in communication with the outlet port of the pump for receiving fluid therefrom, an outlet port, a first pilot port connected in communication with the outlet port thereof, and a second pilot port, the signal duplicator being operable to allow flow therethrough between the inlet port thereof and the outlet port thereof when a pressure condition in the second pilot port thereof exceeds a pressure condition in the first pilot port thereof;

a pressure relief device connected in communication with the outlet port of the signal duplicator operable to provide pressure relief when a predetermined pressure condition is present in the outlet port of the signal duplicator;

at least one working element having an inlet port connected in communication with the outlet port of the pump and a pilot port connected in communication with the second pilot port of the signal duplicator for generating the pressure condition therein;

a high pressure cut-off selector valve having a first inlet port connected in communication with the signal duplicator outlet port, a second inlet port connected in communication with the pilot port of the at least one working element, and an outlet port connected in communication with the actuator port of the pump for delivering the pump control signal thereto, the high pressure cut-off selector valve being selectibly operable in a first condition to allow flow therethrough between the first inlet port thereof and the outlet port thereof to allow fluid signal flow from the signal duplicator outlet port to serve as the pump control signal, and selectibly operable in a second position to allow flow therethrough from the second inlet port to the outlet port thereof for allowing fluid signal flow from the at least one working element to serve as the pump control signal; and a differential relief valve having an inlet port connected in communication with the outlet port of the pump, a first pilot port and a second pilot port, the first pilot port of the differential relief valve being connected in communication with the inlet port thereof, and the second pilot port of the differential relief valve being connected in communication with the outlet port of the signal duplicator, the differential relief valve being operable to prevent relief flow therethrough when pressure conditions in the outlet port of the signal duplicator exceed pressure conditions in the inlet port thereof, and the differential relief valve being operable to allow relief flow therethrough when the pressure conditions in the inlet port thereof exceed the pressure conditions in the outlet port of the signal duplicator.

2. The system, as set forth in claim 1, wherein the pressure relief device is selectibly operable to allow pressure relief therethrough when the pressure condition in the signal duplicator outlet port exceeds one of at least two selectible high pressure conditions.

3. The system, as set forth in claim 1, comprising a plurality of the working elements, the respective pilot ports thereof being connected by at least one resolver to the second pilot port of the signal duplicator.

* * * * *